United States Patent
Pedigo

(10) Patent No.: US 8,174,364 B2
(45) Date of Patent: May 8, 2012

(54) AUTOMATIC MEANS TO TRIGGER RFID TRANSMITTERS

(76) Inventor: Michael Kenneth Pedigo, Watsonville, CA (US)

(*) Notice: Subject to any disclaimer, the term of this patent is extended or adjusted under 35 U.S.C. 154(b) by 116 days.

(21) Appl. No.: 12/581,116

(22) Filed: Apr. 12, 2010

(65) Prior Publication Data

US 2010/0194535 A1 Aug. 5, 2010

Related U.S. Application Data

(60) Provisional application No. 61/106,529, filed on Oct. 17, 2008.

(51) Int. Cl.
*H04Q 5/22* (2006.01)

(52) U.S. Cl. ............. 340/10.1; 340/10.4; 340/12.5; 340/12.51; 455/296; 455/503; 370/252; 345/45

(58) Field of Classification Search ............. 340/10.1, 340/10.4, 12.5, 12.51; 455/296, 503; 370/252; 345/45

See application file for complete search history.

(56) References Cited

U.S. PATENT DOCUMENTS

| | | | | |
|---|---|---|---|---|
| 4,709,401 A * | 11/1987 | Akerberg | ............. | 455/503 |
| 6,140,982 A * | 10/2000 | Fuchter et al. | ............. | 345/45 |
| 7,016,311 B2 * | 3/2006 | Tiernay et al. | ............. | 370/252 |
| 2006/0183454 A1 * | 8/2006 | Al-Mahdawi | ............. | 455/296 |
| 2006/0273882 A1 * | 12/2006 | Posamentier | ............. | 340/10.4 |

* cited by examiner

*Primary Examiner* — George Bugg
*Assistant Examiner* — Sisay Yacob

(57) ABSTRACT

An RFID reader requires significant power supply current, upwards or beyond 0.5 amps. Much of this power is expended to activate the reader's radio frequency transmitter. For example, the reader's transmitter may constantly be active awaiting a RFID tag entering within its electromagnetic field. Sometimes an adequate power source, such as AC mains, is not available to provide continuous operation and instead a battery is powers the reader. This invention detects that a RFID tag is within reader range without using the reader's RF transmitter at full power. As a RFID tag is brought within range of a reader's antenna there is significant mutual inductance coupling between the tag antenna and the reader's antenna and this invention provides a sensitive detector of this mutual inductance. The detection of mutual inductance automatically triggers the reader's transmitter to a higher power which is necessary to fully activate the RFID tag.

6 Claims, 2 Drawing Sheets

AUTOMATIC MEANS TO TRIGGER RFID TRANSMITTERS

CROSS REFERENCE TO RELATED APPLICATIONS

U.S. provisional application No. 61/106,529

BACKGROUND OF THE INVENTION

An RFID reader requires significant levels of power supply current, upwards or beyond 0.5 amps. Much of this power requirement is expended to activate the reader's radio frequency transmitter. For example, the reader's transmitter may constantly be active awaiting a RFID tag entering within its electromagnetic field. This is the usual operation for readers utilized in door entry security, inventory control, shipping and receiving management, and contactless point of sale. However, sometimes an adequate power source, such as AC mains, is not available to provide continuous transmitter operation and instead a battery is used to power the reader.

Battery powered readers typically need a manual control to trigger the reader's transmitter to conserve battery capacity with the transmitter normally off until triggered. The manual control may be by a press of a button, or an insertion of a key, which then activates the reader's transmitter. This must be followed, within a few seconds, by manually placing a RFID tag within the reader's transmitted electromagnetic field before the trigger operation times-out and the transmitter turns off to conserve power.

BRIEF SUMMARY OF THE INVENTION

This invention provides an alternate, automatic means to trigger the reader's transmitter other than said manual signal. In this regard, this invention detects that a RFID tag is within reader range without using the reader's RF transmitter at full power. As a RFID tag is brought within range of a reader's antenna there is significant mutual inductance coupling between the tag antenna and the reader's antenna and this invention acts as an especially sensitive detector of this mutual inductance. The detection of mutual inductance provides an automatic trigger of the reader's transmitter, or otherwise activation of various reader circuits which are normally dormant to preserve power.

DETAILED DESCRIPTION OF THE PREFERRED EMBODIMENT

Figure 1:
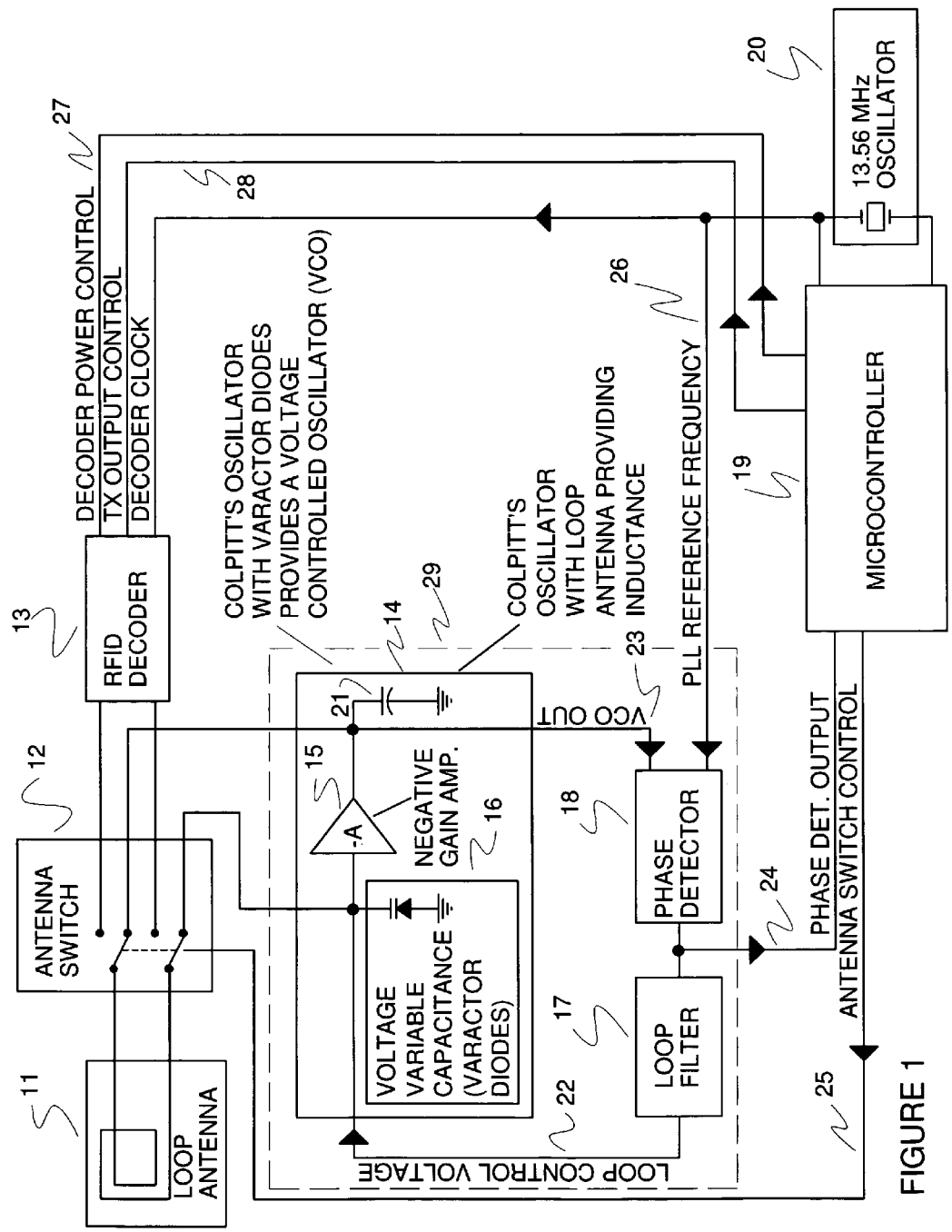
FIG. 1 is a block diagram of a preferred embodiment of the invention that illustrates important component blocks of the invention.

Consider FIG. 1, a RFID reader normally includes a loop antenna 11 and a RFID decoder 13. Between the loop antenna 11 and the RFID decoder 13 we place an antenna switch 12. This antenna switch usually connects the loop antenna 11 to a Colpitt's oscillator 14, therefore the loop antenna 11 becomes a reactive element of the Colpitt's oscillator 14.

The Colpitt's oscillator 14 operates as a voltage controlled oscillator (VCO). As part of the Colpitt's oscillator 14 there includes a voltage variable capacitance 16 which in implemented using varactor diode(s). Changing the DC bias voltage upon the varactor diode(s) 16, which changes their capacitance, this then effects the tuning of the Colpitt's oscillator 14.

The Colpitt's oscillator 14 is composed of a negative gain amplifier 15, the positive reactance of the loop antenna 11, the negative reactance of the varactor diode(s) 16, and the negative reactance of the fixed capacitance 21. (Varactor diode(s) may also be used at the same nodes as the fixed capacitance 21 which would provide increased tuning range of the Colpitt's oscillator 14.)

The output 23 of the Colpitt's oscillator 14 drives both the loop antenna 11 and an input of a phase detector 18. The phase detector 18 also has another input 26 which is a constant frequency 13.56 MHz oscillator 20. The output 24 of the phase detector 18 connects to a loop filter 17 which is a low pass filter. The output 22 of the loop filter 17 is then used to bias the varactor diode(s) 16 thereby rendering the Colpitt's oscillator 14, phase detector 18, and loop filter 17 together as a phase lock loop 29.

Operation of the phase lock loop 29 causes a phase lock condition between the Colpitt's oscillator 14 and the 13.56 MHz oscillator 20. If the inductance of the loop antenna 11 is changed, then the phase lock loop 29 will adjust the varactor diode 16 bias voltage (loop control voltage) 22 to keep the Colpitt's oscillator 14 in phase lock with the 13.56 MHz oscillator 20.

As a RFID tag is placed within the magnetic field generated by the Colpitt's oscillator 14 and radiated by the loop antenna 11 the mutual inductance from the RFID tag's antenna changes the effective inductance of the loop antenna 11. The phase lock loop 29 compensates by providing a change in the varactor bias voltage 22 to keep the phase lock condition. RFID tags include antennas which are purposely tuned for efficient magnetic coupling at the frequency of operation of the RFID reader, normally 13.56 MHz. I make the Colpitt's oscillator 14 operate at this same 13.56 MHz frequency. This maximizes the amount of mutual inductance between the RFID tag loop antenna and the RFID reader loop antenna 11. Other items that may come into the loop antenna's 11 field likely do not include an antenna structure tuned for efficient coupling to the loop antenna 11 and do not appreciably contribute a mutual inductance to the loop antenna 11.

A change in inductance in the loop antenna 11 affects the waveform on the output 24 of the phase detector 18. The waveform is typically a pulse width modulated rectangular wave with a frequency of 27.12 MHz (twice 13.56 MHz). The loop filter 17 averages the pulse widths to provide a correction voltage to the varactor diode(s) 16 wherein the phase lock loop feedback keeps the Colpitt's oscillator's 14 frequency in phase lock with the 13.56 MHz oscillator 20. The output 24 of the phase detector 18 is also connected to an input pin of a microcontroller 19. A timing/counting algorithm, running within the microcontroller 19, provides a means to both average and digitize, therewith producing a numerical representation of the level of pulse width modulation. Upon detection of a significant change in pulse width modulation, which is related to inductance changes in the loop antenna 11, the microcontroller 19 temporarily switches the loop antenna 11 connections from the phase lock loop 29 to the RFID decoder 13. Switching is accomplished through an antenna switch 12.

At approximately the same time the microcontroller 19 activates the RFID decoder 13 and/or enables the RFID decoder's 13 transmitter output Immediately after this moment, with the loop antenna 11 connected to the RFID decoder 13 and with the RFID decoder 13 activated and transmitting, the RFID tag is read. Then later, after a time-out, the microcontroller 19 deactivates the RFID decoder 13 and/ or RFID decoder's 13 transmitter, as well as, switches the loop antenna 11 back to the Colpitt's oscillator 14.

The use of a phase lock loop, as described herein, assures that the Colpitt's oscillator 14 radiates within the RFID band centered at 13.56 MHz. This fixates the oscillating frequency of the Colpitt's oscillator which is necessary to comply with government regulations for electromagnetic fields.

As mentioned above, when using this invention, the detection of the mutual inductance from an RFID tag is necessary to activate the RFID decoder 13 and to switch the connections of the loop antenna 11. This provides immunity against false triggers from close proximity of items, other than RFID tags, to the loop antenna 11. Various non-magnetic and/or untuned items, such as, hands, paper, plastic items, coins, etc. do not provide much mutual inductance.

Figure 2:
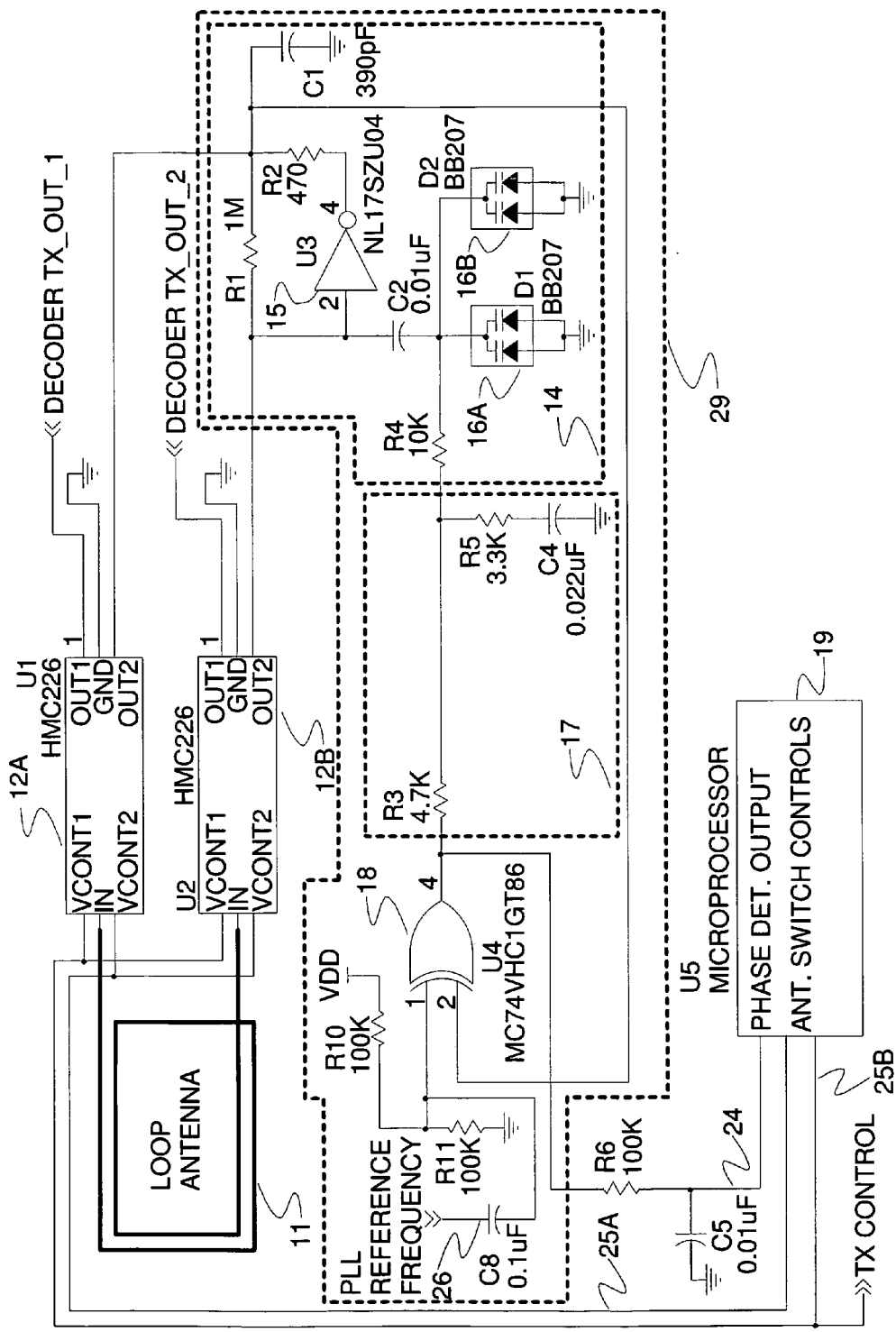
FIG. 2 is a schematic diagram of the preferred embodiment

A schematic of the preferred embodiment is shown in FIG. 2. Radio Frequency switches U1 and U2 (12A and 12B) are both made from integrated circuits HMC226, manufactured by the Hittite Microwave Corporation. These switches U1 and U2 select the loop antenna 11 connectivity, either to the negative gain amplifier 15 or to a balanced transmitter output of a RFID decoder 13. The negative gain amplifier 15 is made from another integrated circuit, a NL17SZU04 unbuffered invertor manufactured by the On Semiconductor.

Connecting the loop antenna 11 to the negative gain amplifier 15 provides for a Colpitt's oscillator that is voltage tunable by the varactor diodes D1 and D2 (16A and 16B) constructed from two BB207 dual diode packages manufactured by NXP Semiconductors. The Colpitt's oscillator provides a voltage controlled oscillator (VCO) which along with a phase detector 18 and a loop filter 17 produces a phase lock loop (PLL) 29. The phase detector 18 is a MC74VHC1GT86 exclusive OR gate manufactured by On Semiconductor and the loop filter 17 is a passive filter composed two two resistors (R3 and R5) and a capacitor C4.

The phase detector output also connects, through a low pass filter, to an analog to digital convertor located within a microprocessor 19. While the loop antenna 11 is connected to the negative gain amplifier 15 and a RFID tag is positioned close to the loop antenna 11 mutual inductance caused by the RFID tag causes a change in voltage on the filtered phase detector output 24. This voltage change is detected by the microprocessor 19 and the microprocessor algorithm then activates the transmitter on the RFID decoder and simultaneously connects the loop antenna 11 through the radio frequency switches 12A, 12B to the RFID decoder.

Upon RFID decoder detection of a valid RFID tag, or after a preset time interval, the microprocessor 19 controls the radio frequency switches 12A, 12B to again connect the loop antenna 11 to the negative gain amplifier 15.

I claim:

1. A radio frequency identification (RFID) system that includes:
    an antenna;
    an antenna switch that is switchable into a first and second state;
    a phase lock loop that includes a voltage controlled oscillator, a phase detector, and a loop filter;
    a RFID decoder;
    a microcontroller or microprocessor;
    said voltage control oscillator in said phase lock loop connects to said antenna switch;
    said RFID decoder connects to said antenna switch;
    said antenna connects to said antenna switch;
    a reactance of said antenna provides frequency tuning of said voltage controlled oscillator with said antenna switch in the said first state;
    an output of said phase lock loop provides information of said frequency tuning of said voltage controlled oscillator,
    said output of said phase lock loop connects to said microcontroller or said microprocessor;
    an output on said microcontroller or said microprocessor changes logic level dependent upon said information provided on said output of said phase lock loop;
    said output of said microcontroller or said microprocessor selects the state of said antenna switch between said first state and said second state; and
    said antenna is connected to said RFID decoder with said antenna switch in the said second state.

2. A radio frequency identification (RFID) system that includes:
    an antenna that has reactance affected by a mutual inductance from a proximity of a RFID tag;
    a voltage controlled oscillator;
    a microcontroller or microprocessor;
    a means to connect said voltage controlled oscillator to said antenna so that a reactance of said antenna provides tuning to said voltage controlled oscillator;
    a means to connect said voltage controlled oscillator to a phase lock loop for sensing said tuning of said voltage controlled oscillator whereas said tuning measures the proximity of said RFID tag;
    wherein said phase lock loop for sensing said tuning of said voltage controlled oscillator is utilized to activate or deactivate a RFID decoder;
    provides a phase detector output of said phase lock loop; and
    a means to connect said phase detector output of said phase lock loop to said microcontroller or said microprocessor that provides a signal to said microcontroller or said microprocessor when to enable or disable said RFID decoder.

3. The radio frequency identification (RFID) system of claim 1, wherein said antenna switch has a two pole two throw capability.

4. The radio frequency identification (RFID) system of claim 1, wherein a part of said reactance of said antenna is from a mutual inductance of a proximate RFID tag.

5. The radio frequency identification (RFID) system of claim 1, wherein said voltage controlled oscillator is a Colpitt's oscillator.

6. The radio frequency identification (RFID) system of claim 2, wherein said voltage controlled oscillator is a Colpitt's oscillator.

* * * * *